US011273531B2

(12) United States Patent
Skrna

(10) Patent No.: US 11,273,531 B2
(45) Date of Patent: Mar. 15, 2022

(54) SMART COOLANT PUMP

(71) Applicant: Fanuc America Corporation, Rochester Hills, MI (US)

(72) Inventor: Paul Skrna, Lake Orion, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 16/566,143

(22) Filed: Sep. 10, 2019

(65) Prior Publication Data

US 2020/0078896 A1 Mar. 12, 2020

Related U.S. Application Data

(60) Provisional application No. 62/728,910, filed on Sep. 10, 2018.

(51) Int. Cl.
| | | |
|---|---|---|
| *B23B 27/10* | (2006.01) | |
| *B23Q 11/10* | (2006.01) | |
| *B23Q 11/12* | (2006.01) | |

(52) U.S. Cl.
CPC ........ *B23Q 11/126* (2013.01); *B23Q 11/1038* (2013.01); *Y10T 29/5107* (2015.01); *Y10T 408/44* (2015.01)

(58) Field of Classification Search
CPC ............... F04D 27/004; F04D 15/0088; F04D 15/0236; F04D 15/0066; F04D 15/0094;
(Continued)

(56) References Cited

U.S. PATENT DOCUMENTS 3,555,963 A * 1/1971 Evans ................. B23Q 1/0063
409/131
3,702,740 A 11/1972 Pettigrew
(Continued)

FOREIGN PATENT DOCUMENTS

| EP | 2388507 A1 * | 11/2011 | ............... F16N 7/38 |
| WO | 2012119723 A2 | 9/2012 | |

OTHER PUBLICATIONS

Machine Translation, EP2388507, Boes et al., Nov. 23, 2011. (Year: 2011).*
(Continued)

*Primary Examiner* — Chwen-Wei Su
(74) *Attorney, Agent, or Firm* — John A. Miller; Shumaker, Loop & Kendrick, LLP

(57) ABSTRACT

A smart coolant pump for a robotic or computer-controlled machine. The smart pump uses a servo motor rather than a conventional industrial motor such as an induction motor. The smart pump has inherent torque and speed sensing, and a controller integrated with the computer-controlled machine controller. The motor torque/speed sensing and coolant pressure/flow sensing enable immediate detection of any anomalous conditions such as low coolant level or coolant port blockage. The smart pump can be configured to run at a certain speed and provide a specific coolant pressure and flow rate for each machining operation performed at the station, and to run at a very low speed between machining operations. This speed configurability saves energy and allows the pump and coolant to run at lower temperatures compared to conventional constant-speed coolant pumps.

20 Claims, 3 Drawing Sheets

Smart Coolant Pump

(58) Field of Classification Search
CPC .................. F04B 49/065; F04B 49/20; F04B 2203/0207; F04B 2203/0209; Y10T 29/5107; Y10T 408/44; B23Q 11/10; B23Q 11/1015; B23Q 11/1038; B23Q 11/126; B23B 27/10; B23B 51/06; B23B 2250/12; G05B 15/02; G05B 2219/41303

See application file for complete search history.

(56) References Cited

U.S. PATENT DOCUMENTS

| | | | | |
|---|---|---|---|---|
| 3,782,501 | A | * | 1/1974 | Pagella ................. B23Q 11/10 184/6.4 |
| 5,072,948 | A | * | 12/1991 | Kostrzewski .......... B23Q 11/10 277/320 |
| 5,951,216 | A | | 9/1999 | Antoun |
| 6,050,918 | A | | 4/2000 | Kuramoto |
| 6,874,977 | B2 | * | 4/2005 | Cook ................. B23B 51/0493 408/1 R |
| 8,568,198 | B2 | * | 10/2013 | Leishman ............... B24B 55/03 451/5 |
| 2001/0000611 | A1 | | 5/2001 | Cline et al. |
| 2003/0147708 | A1 | | 8/2003 | Cook et al. |
| 2010/0178120 | A1 | | 7/2010 | Packard |
| 2012/0245742 | A1 | | 9/2012 | Clausmann et al. |
| 2014/0318390 | A1 | | 10/2014 | Bauersachs et al. |
| 2016/0074920 | A1 | * | 3/2016 | Koh ....................... B21D 24/02 72/453.13 |
| 2020/0049153 | A1 | * | 2/2020 | Headrick ................ E21B 47/06 |

OTHER PUBLICATIONS

PCT International Search Report of the International Searching Authority dated Nov. 9, 2019 and mailed Dec. 3, 2019 for International Application No. PCT/US2019/050460 filed Sep. 10, 2019.

* cited by examiner

SMART COOLANT PUMP

CROSS-REFERENCE TO RELATED APPLICATIONS

This application claims the benefit of the priority date of U.S. Provisional Patent Application Ser. No. 62/728,910, titled SMART COOLANT PUMP, filed Sep. 10, 2018.

BACKGROUND

Field

The present disclosure relates to the field of coolant pumps and, more particularly, to a coolant pump for a robotic or computer-controlled machine which uses a servomotor with a controller and sensors for measuring coolant pressure and flow rate during drilling/machining operations, which in turn enables early detection of any problems involving low coolant level or coolant flow blockage, and further enables automatic adjustment of pump speed based on real time coolant requirements as dictated by the drilling/machining operation which is taking place.

Discussion of the Related Art

Automated robotic drilling/machining stations and computer numerical control (CNC) machines are known in the art which perform complex, multi-axis, multi-tool machining operations at the touch of a control screen button. For example, such a computer-controlled machine could machine a part having several different design variations, where the part is machined from a solid block of metal, and the finished part includes numerous through-holes, non-through-holes, bevels, drilled and tapped holes, etc., and the holes and machined features are aligned along several different orientation axes relative to the part.

CNC and similar machines of the type described above require a flow of coolant, such as machining oil, directed at the cutting operation. The coolant serves to both cool the part and the tool, and to flush "chips" of cut metal away from the tool and out of any hole which is being machined. Existing CNC machines use simple coolant pumps which are either on or off, depending on what operation is being performed at a given time by the station. For example, when the machine is drilling a hole in the part, the coolant pump is on and the flow of coolant is directed at the drill bit in the hole. Conversely, after the drilling operation, when the machine is changing tools in preparation for the next machining step, the coolant pump is typically turned off.

Although the simple coolant pumps described above can perform adequately, they often pump more coolant than is needed for a given operation, resulting in unnecessary energy usage. Furthermore, the frequent switching off and on of these pumps increases wear and tear on the pump, which increases the amount of maintenance and repair required. In addition, simple coolant pumps cannot detect problems related to low coolant level or low coolant flow rate, and these problems can quickly result in damage to parts and tools in the CNC machine.

Therefore, it is desired to provide a smart coolant pump which is integrated with the machine controller and provides the proper coolant flow rate for any drilling/machining operation.

SUMMARY

In accordance with the teachings of the present disclosure, a smart coolant pump for a computer-controlled machining station is described. The smart pump uses a servo motor rather than a conventional industrial motor such as an induction motor. The smart pump has inherent torque and speed sensing, and a controller integrated with the machining station controller. The motor torque/speed sensing and coolant pressure/flow sensing enable immediate detection of any anomalous conditions such as low coolant level or coolant port blockage. The smart pump can be configured to run at a certain speed and provide a specific coolant pressure and flow rate for each machining operation performed at the station, and to run at a very low speed between machining operations. This speed configurability saves energy and allows the pump and coolant to run at lower temperatures compared to conventional constant-speed coolant pumps.

Additional features of the presently disclosed techniques will become apparent from the following description and appended claims, taken in conjunction with the accompanying drawings.

DETAILED DESCRIPTION OF THE EMBODIMENTS

The following discussion of the embodiments of the disclosure directed to a smart coolant pump integrated with a robotic or computer-controlled machine is merely exemplary in nature, and is in no way intended to limit the disclosed devices or their applications or uses.

Figure 1:
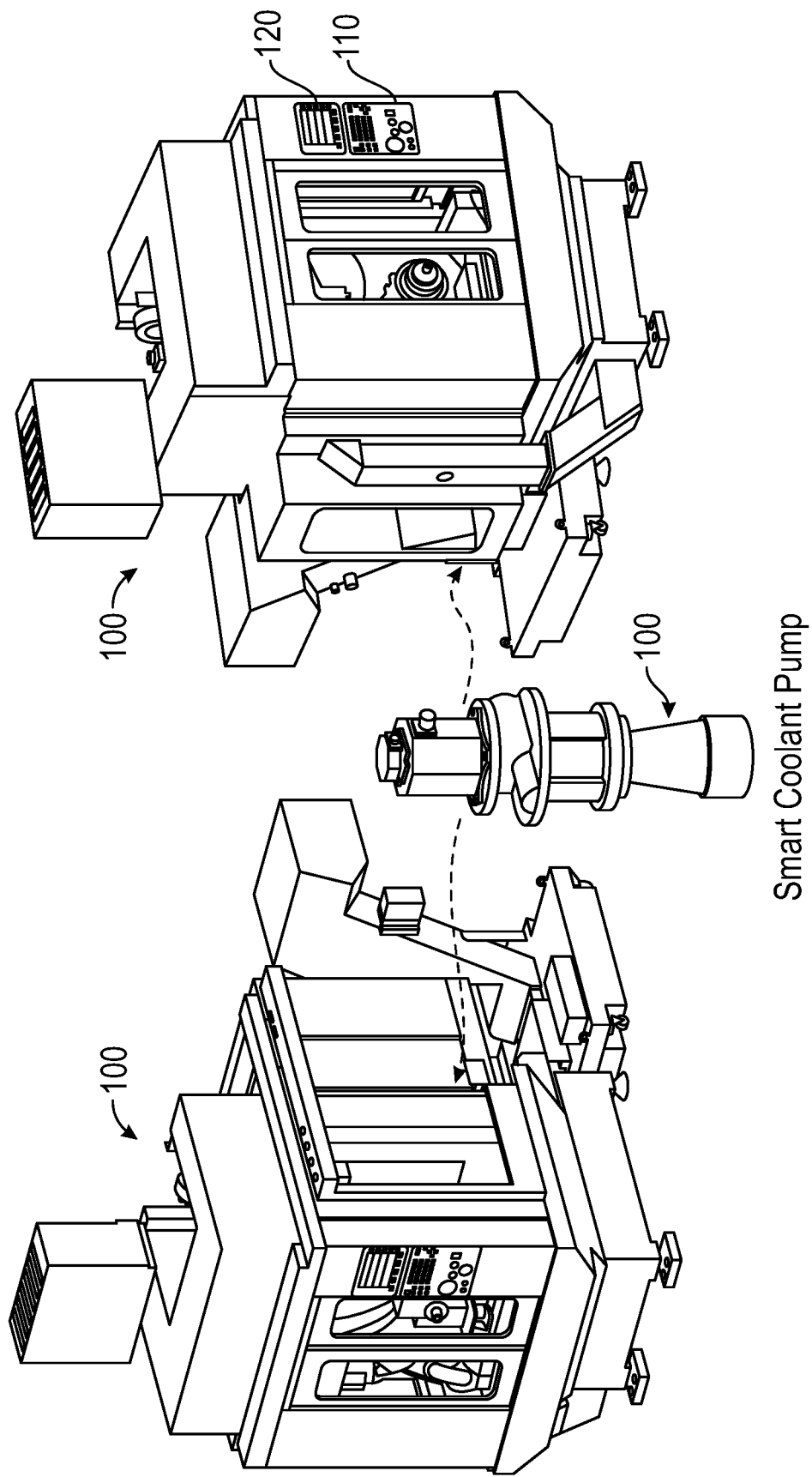
FIG. 1 is an illustration of a smart coolant pump integrated with a computer-controlled machine, according to an embodiment of the present disclosure.

FIG. 1 is an illustration of a flexible manufacturing facility including two computer-controlled machines 100. The computer-controlled machines 100 may be any type of CNC or computer-controlled machines or robotic drilling/machining stations, and are capable of automatically producing machined parts of many different pre-programmed designs, with tremendous speed and quality. The computer-controlled machines 100 include fixtures for holding a workpiece in place, and machine tools for performing operations such as drilling, milling and thread tapping along any arbitrarily-oriented axis relative to the workpiece. The machines 100 of FIG. 1 are equipped with a new smart coolant pump 10, according to embodiments of the present disclosure.

The smart coolant pump 10 is shown outside of the computer-controlled machines 100 in FIG. 1 for visual impact only. In reality, one of the smart coolant pumps 10 is provided inside each of the computer-controlled machines 100, as discussed in detail below. The smart coolant pump 10 in each of the computer-controlled machines 100 provides coolant flow to the machining operations, directing coolant to the workpiece and tool through one or more nozzles, where coolant recirculates to a tank and back to the smart coolant pump 10.

Each of the computer-controlled machines 100 includes a controller 110 and a display unit 120. Each of the computer-controlled machines 100 further includes robotic equipment (not show) including grasping tools configured for selecting a workpiece from a supply stock and holding the workpiece in a fixed position during machining operations, and interchangeable machine tools such as mills, drills, bores, taps, etc. for performing machining operations on the workpiece according to a predefined program running on the controller 110.

Existing computer-controlled machining stations which use conventional coolant pump motors suffer from several limitations. For example, conventional coolant pumps don't provide feedback on motor torque or speed. Without motor torque or speed feedback, it is not readily apparent whether the pump is operating normally, pumping the expected volume of coolant, etc. Conventional coolant pumps also do not provide coolant temperature feedback. Coolant temperature is important and may be indicative of a need for more or less coolant flow. Furthermore, conventional coolant pumps cannot change speed or adjust the pressure and flow rate of coolant. In addition, conventional coolant pumps consume more electrical energy than necessary, because they are frequently stopped and restarted, and run at a fixed speed which provides a coolant flow rate which is often higher than required for a given machining operation.

According to embodiments of the present disclosure, the computer-controlled machines 100 include the smart coolant pump 10 which overcomes the limitations of conventional coolant pumps discussed above. The smart coolant pump 10 is driven by a servo motor 12 (FIG. 2) which is completely controllable in terms of pump rotational speed and ramp-up and ramp-down speed profiles. Sensors and control logic, discussed below, enable the behavior of the smart coolant pump 10 to be tailored to any combination of tool, operation and condition which may be experienced in the computer-controlled machines 100.

For the purposes of the following discussion, consider that the controller 110 in the computer-controlled machines 100 controls the operations of the machine itself (positioning the workpiece and performing all of the machining operations on the workpiece to produce the desired part) and also controls the operation of the smart coolant pump 10. A separate controller for the smart pump 10 could also be provided, where in that case the pump controller would be in communication with the controller 110 of the computer-controlled machines 100.

As mentioned above, the smart coolant pump 10 is driven by the servo motor 12. The servo motor 12 is equipped with sensors which inherently provide speed and torque signals to the pump controller (in this case, the machine controller 110). For example, the servo motor 12 may include a position encoder, a rotational speed sensor and a torque sensor. Signals from the torque, speed and position sensors are provided to the controller 110 or other pump controller, which enables real-time feedback control of speed and measurement of torque.

The motor torque signal can be used by the controller 110 to determine if a proper supply of coolant is being provided to the inlet of the pump 10. Inadequate coolant supply could be caused by coolant level being low, a clogged coolant filter or inlet port, or a complete absence of coolant. If one of these conditions is detected via a low torque value, the controller 110 can prevent the computer-controlled machines 100 from cutting or performing any other machining operation; an alarm signal is also preferably provided to an operator in such a situation. Prevention of inadvertent dry cutting by the computer-controlled machines 100 reduces costs for tooling repair and replacement, and reduces the number of rejected parts.

The motor speed signal enables real-time feedback on coolant flow rate, which is a function of pump speed. This allows the machine controller 110 to ensure that the motor speed corresponds to a coolant flow rate selected by the operator for any particular tool, operation and condition. For example, drilling a small diameter hole in aluminum requires much less coolant than drilling a large diameter hole in steel. The smart coolant pump 10 can be configured (see FIG. 3) to provide the desired amount of coolant for each operation as selected by the operator, and this coolant control is then included in the operation of the computer-controlled machines 100 by way of the motor speed signal. No additional hardware is required in order to control pump speed; the servo motor 12 already includes the sensors and the controllability features. The controller 110 allows a particular volume flow rate of coolant (and corresponding speed) to be selected for each individual operation performed by the computer-controlled machines 100, as discussed further below.

Another benefit of the smart coolant pump 10 is that the coolant sub-system can run at a lower temperature. The capability to change pump speeds means that the temperature of the motor 12 and the coolant can be lowered by slowing down the motor 12 in situations when maximum flow rate of coolant are not required from the smart coolant pump 10. Running the motor 12 at a lower speed reduces coolant sub-system temperature and also saves energy.

The servo motor 12 in the smart coolant pump 10 also enables slowing down the motor 12 during times when coolant flow is not required (such as when tools are being changed in between machining operations). Slowing down the motor 12 and the pump 10 to an "idle" speed, instead of stopping the motor as is done with traditional coolant pumps, not only reduces the number of stop/start cycles of the motor 12, but also enables the motor 12 and controller 110 to capture the energy during deceleration to provide regenerative power—thus further lowering energy costs.

Figure 2:
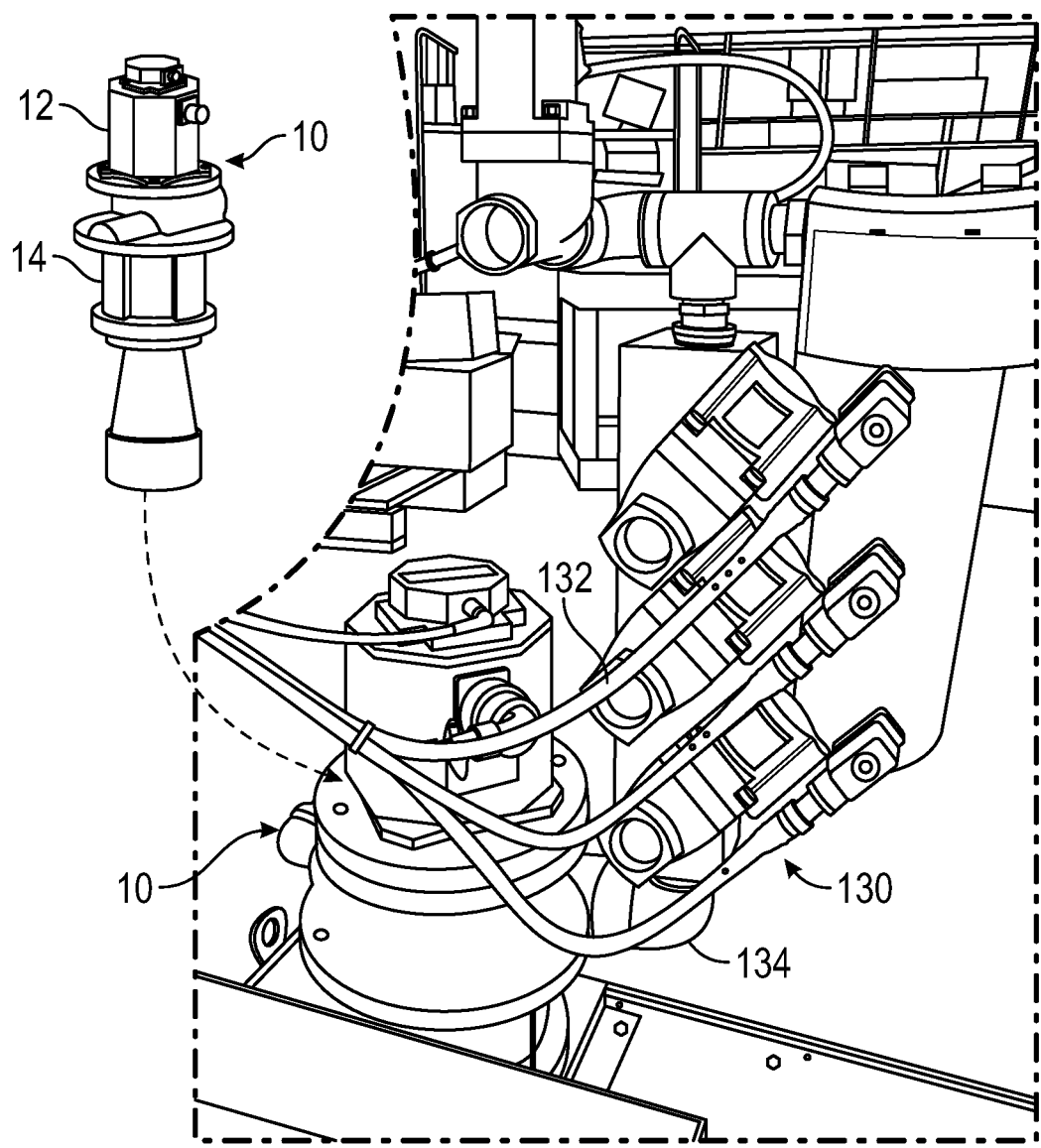
FIG. 2 is an illustration of one of the smart coolant pumps coupled to a coolant manifold, representing a partial implementation of a coolant sub-system in the computer-controlled machine of FIG. 1, according to an embodiment of the present disclosure.

FIG. 2 is an illustration of one of the smart coolant pumps 10 coupled to a coolant manifold 130, representing a partial implementation of a coolant sub-system in the computer-controlled machine 100. The smart coolant pump 10, including the servo motor 12 and a pump body 14, are shown in the small inset figure at the top left. The upper portion of the smart coolant pump 10, including all of the servo motor 12 and the upper portion of the pump body 14, are visible in the main larger image of FIG. 2.

The coolant manifold 130 includes a plurality of valve bodies controlled by servos or solenoids, where each valve is controlled by an electrical signal line 132. Each of the valves controls flow through one branch of the coolant circuit, where each branch includes pipes and a nozzle (not shown) to deliver coolant to a particular location inside the computer-controlled machine 100. For example, one valve could be configured to control coolant flow to a nozzle aimed at a milling station located on a top part of the workpiece, another valve could be configured to control coolant flow to a nozzle aimed at a drilling station located on an end of the workpiece, etc. The manifold 130 is connected (fluidly coupled) to the pump body 14 by a fluid coupler 134, which can be seen near the bottom center of FIG. 2.

As mentioned previously, by simply using the inherent speed and torque sensors of the servo motor 12, the smart coolant pump 10 can detect and react to situations such as improper coolant flow, low coolant level or lack of coolant, and thereby prevent tooling wear/breakage and ensure part dimensional accuracy. In addition, the smart coolant pump 10 can be fitted with coolant pressure and flow rate sensors and the pressure and flow signals provided to the controller 110 or other pump controller. Knowing coolant pressure and flow rate through direct measurement, the controller 110 can more precisely control the speed of the smart pump 10 to obtain a required coolant pressure and/or flow rate which may be prescribed for a particular tool or operation in the computer-controlled machine 100. The coolant pressure and flow rate signals can also be monitored for values outside of a prescribed range—such as too high or low of a pressure, or too low of a flow rate—and the controller 110 can stop the operation in the computer-controlled machine 100 if appropriate.

The coolant pressure and flow rate values, and the relationship between them, may also be used to make other determinations about maintenance of the computer-controlled machine 100. For example, it may be desirable to change or treat the coolant after a certain total volume flow, which takes into account actual coolant usage, rather than simply doing so after a certain number of operational hours. The volume flow rate signal can be integrated to obtain a cumulative volume flow, which can be compared to the predefined threshold, where the need for a coolant and filter change can be signaled to an operator when the cumulative volume flow exceeds the threshold.

Another benefit of the smart coolant pump 10 is that a smaller coolant tank can be used than with standard pumps. This is because the smart coolant pump 10 is often operated at less than full speed, whereas traditional coolant pumps always run at full speed even if less coolant flow is needed.

Pump maintenance is also decreased with the smart coolant pump 10, as the reduced speed profiles lower the stress on all pump components. Electrical energy consumption is also reduced with the smart coolant pump 10, both due to lower average pump speeds compared to a traditional pump, and due to the regenerative power capture capability of the servo motor 12 used in the smart coolant pump 10.

Figure 3:
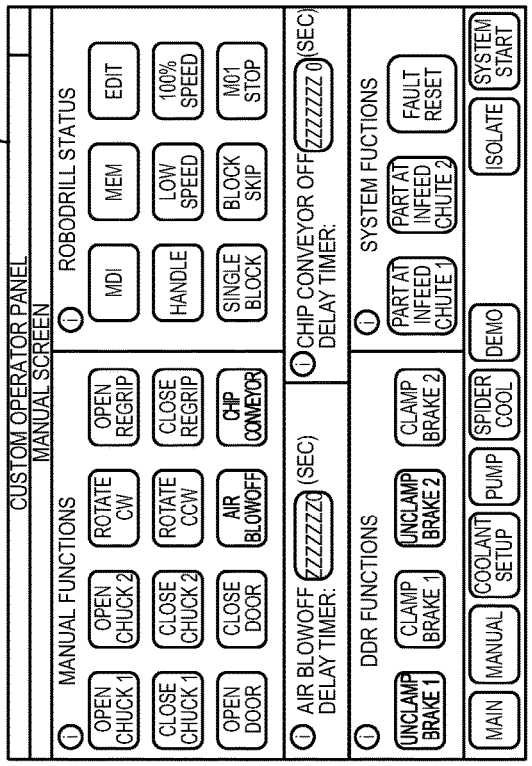
FIG. 3 is an illustration of a plurality of user interface screens for configuring and monitoring the smart coolant pump of FIGS. 1-2, according to an embodiment of the present disclosure.
Figure 3:
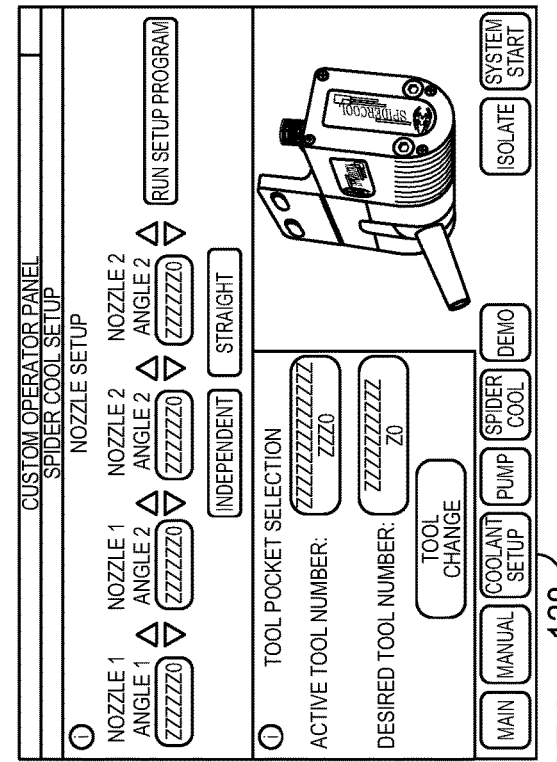
Figure 3:
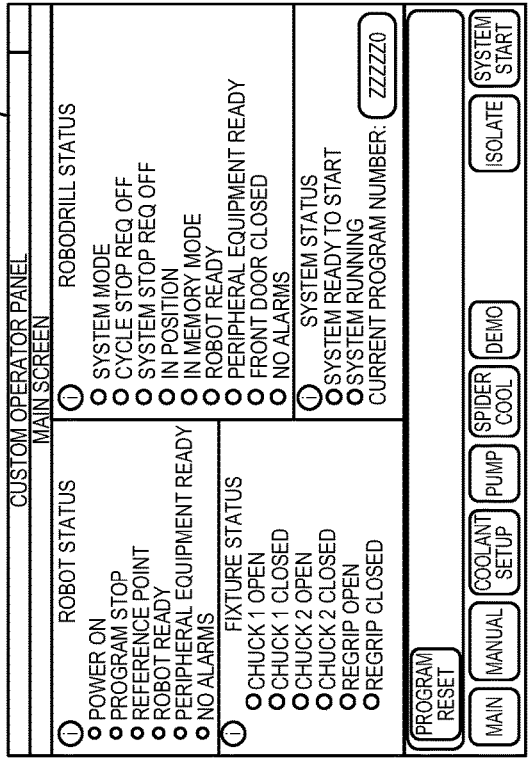

FIG. 3 is an illustration of a plurality of user interface screens 122-128 for configuring and monitoring the smart coolant pump 10. The user interface screens 122-128 are displayed on the display unit 120 (shown in FIG. 1) of the computer-controlled machine 100.

The interface screens 122-128 provide the capability for a user to completely configure coolant flow for each tool, operation and condition in the computer-controlled machine 100. For example, a drilling operation, using a 30 mm drill turning at 500 RPM, drilling a hole in cast aluminum, at a drill feed rate of 1 mm/sec, represents a particular combination of tool, operation and condition. Each such combination (tool, operation, condition) can be configured with coolant settings including "center through coolant" (CTC— discussed below), Cut (coolant flow to the tool tip), Wall Wash, Bed Wash and Flow rate/volume. Each of these different coolant flows is controlled by a separate valve/nozzle of the coolant manifold 130 shown in FIG. 2.

The interface screens 122 and 124 are general set-up screens for the computer-controlled machine 100, including controls of workpiece fixtures, drilling/machining operations, and control of other features such as an air blower and a chip conveyor. The interface screens 122 and 124 also provide access to the interface screens 126 and 128 where coolant system parameters are configured.

The interface screen 126 includes coolant configuration controls for a particular combination of tool, operation and condition. Configuration options include where to direct coolant flow (the cut operation, wall, bed, and/or CTC), and corresponding flow rates. From the coolant flow locations and flow rates selected, an overall coolant pump flow rate can be determined. Other configuration options include a delay timer for turning off or reducing the speed of the pump 10 after an operation.

The interface screen 128 is a configuration control screen for individual nozzles in the coolant system. The interface screen 128 is known as a spider cool setup screen, as the individual pipes and nozzles can be directed at particular angles to provide the coolant flow in the location and amount needed for proper cooling and lubrication of the cutting operation. The user can turn coolant on during the configuration process to visually verify a flow rate for a particular machine tool and location.

The interface screens 126 and 128 are shown here to illustrate the configurability of the coolant system, which results in an optimized flow and placement of coolant for a particular tool, operation and condition. With the total flow rate thus defined, the smart coolant pump 10 offers the capability to run at the speed necessary to deliver the required coolant flow rate, and verify proper coolant flow through servo motor feedback and sensor measurements.

Some machining operations require "center-through coolant" (CTC), where coolant is provided directly through the center of the tool (such as a milling head). CTC requires a relatively low flow rate of coolant, but at a much higher pressure (e.g., 1000 psi) than is used for nozzle flow to normal cutting operations, wall washing, etc. (which might run at, for example, 100 psi). For this reason, CTC is typically provided via a separate coolant pump and separate coolant circuit than the main coolant system. The CTC coolant system can be powered by another smart coolant pump, where the CTC pump has the same characteristics as the smart coolant pump 10 (servo motor driven, inherent torque and speed sensing and control), but the CTC pump is smaller than the smart coolant pump 10.

Throughout the preceding discussion, various controllers are described and implied—for controlling motions and tasks of the computer-controlled machines 100, the smart pumps 10, etc. It is to be understood that the software applications and modules of these controllers are executed on one or more computing devices having a processor and a memory module. In one non-limiting embodiment, each of the computer-controlled machines 100 has a machine controller (110), and the smart pump 10 may be controlled by the machine controller 110 or its own dedicated pump controller. Communication between the machine controllers 110, pump controllers and a factory master controller may be over a hard-wire network, or may use any suitable wireless technology—such as a cellular phone/data network, Wi-Fi, broadband Internet, Bluetooth, etc.

As outlined above, the disclosed smart coolant pump with servo motor drive and controls integrated with a robotic or computer-controlled machine offers several advantages over prior art techniques. The ability to control pump speed and coolant flow rate for each specific machining tool/operation/condition, and identify coolant flow problems before part or tool damage is incurred, is far superior to typical "on or off" coolant pumps. The features of the smart coolant pump result in lower maintenance costs, lower energy consumption, and better detection of problems such as low coolant level or flow blockage.

While a number of exemplary aspects and embodiments of the smart coolant pump integrated with a robotic or computer-controlled machine have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A coolant pump system for a computer-controlled machine, said system comprising:
   a servo motor including motor torque and motor speed sensors;
   a pump body mechanically coupled to the servo motor, where the pump body includes a pumping element which pumps coolant when actuated by rotation of the servo motor;
   a coolant pressure sensor at an outlet of the pump body;
   a coolant flow rate sensor in a fluid circuit downstream of the pump body; and
   a controller receiving signals from the motor torque and motor speed sensors, the coolant pressure sensor and the coolant flow rate sensor, said controller providing control signals to the servo motor, based on the received signals, to achieve a predetermined coolant pressure or coolant flow rate prescribed for a particular machining operation of the computer-controlled machine,
   where the controller is configured to cause the servo motor to reduce rotational speed, but not stop, when the machining operation is complete and before a next machining operation begins.

2. The system according to claim 1 wherein the controller is further configured to take a preemptive action when the signals from the motor torque and motor speed sensors indicate a coolant supply problem.

3. The system according to claim 2 wherein the coolant supply problem is indicated by a motor torque signal below a threshold value for a given motor speed.

4. The system according to claim 2 wherein the coolant supply problem is a low coolant level, an absence of coolant, or a blockage in a coolant supply passage.

5. The system according to claim 2 wherein the preemptive action is issuing a warning alert.

6. The system according to claim 2 wherein the preemptive action is stopping machining operations on the computer-controlled machine.

7. The system according to claim 1 wherein the controller and the servo motor are configured to recover regenerative electrical energy when the controller signals the servo motor to reduce rotational speed.

8. The system according to claim 1 wherein the controller also controls the computer-controlled machine, and the controller is configurable to provide control signals to the servo motor to achieve a different predetermined coolant pressure or coolant flow rate for each different machining operation of the computer-controlled machine.

9. The system according to claim 8 wherein the different machining operations include drilling, milling and thread tapping, and the predetermined coolant pressure or coolant flow rate is determined based on tool diameter, rotational speed and feed rate, and workpiece material.

10. The system according to claim 1 wherein the servo motor and the pump body are used as a main coolant pump in the computer-controlled machine.

11. The system according to claim 10 further comprising a second servo motor and a second pump body used as a center-through coolant pump in the computer-controlled machine, where the coolant is pumped through a center of a tool used in the computer-controlled machine.

12. An industrial machining station comprising:
    one or more machine tools arranged inside a housing;
    a machining station controller in communication with the one or more machine tools, said machining station controller being configured to control the one or more machine tools to perform a prescribed sequence of machining operations on a workpiece in order to produce a part; and
    a coolant sub-system for applying a coolant to the workpiece and a tool during the machining operations, said coolant sub-system including a coolant pump coupled to a coolant pipe network, said coolant pump comprising;
    a servo motor including motor torque and motor speed sensors;
    a pump body mechanically coupled to the servo motor and fluidly coupled to the coolant pipe network, where the pump body includes a pumping element which pumps coolant through the coolant pipe network when actuated by rotation of the servo motor;
    a coolant pressure sensor at an outlet of the pump body;
    a coolant flow rate sensor in a fluid circuit downstream of the pump body;
    a second servo motor and a second pump body used as a center-through coolant pump in the industrial machining station, where the coolant is pumped through a center of a tool used in the machining station; and
    a pump controller receiving signals from the motor torque and motor speed sensors, the coolant pressure sensor and the coolant flow rate sensor, said pump controller providing control signals to the servo motor to achieve a predetermined coolant pressure or coolant flow rate prescribed for each of the machining operations, where the predetermined coolant pressure or coolant flow rate is communicated from the machining station controller.

13. The machining station according to claim 12 wherein the pump controller and the servo motor are configured to recover regenerative electrical energy when the pump controller signals the servo motor to reduce rotational speed.

14. The machining station according to claim 12 wherein the pump controller is configured to cause the servo motor to reduce rotational speed, but not stop, when one machining operation is complete and before a next machining operation begins.

15. The machining station according to claim 12 wherein the machining operations include drilling, milling and thread tapping, and the predetermined coolant pressure or coolant flow rate is determined based on tool diameter, rotational speed and feed rate, and workpiece material.

16. A coolant pump for a computer-controlled machine, said pump comprising:
    a servo motor including motor torque and motor speed sensors;
    a pump body mechanically coupled to the servo motor, where the pump body includes a pumping element which pumps coolant when actuated by rotation of the servo motor; and
    a controller receiving signals from the motor torque and motor speed sensors, said controller providing control signals to the servo motor, based on the signals from the motor torque and motor speed sensors, to achieve a predetermined coolant pressure or coolant flow rate prescribed for a particular machining operation of the computer-controlled machine, where the controller and the servo motor are configured to recover regenerative electrical energy when the controller signals the servo motor to reduce rotational speed.

17. The pump according to claim 16 wherein the pump is used as a main coolant pump in the computer-controlled machine.

18. The pump according to claim 16 wherein the pump is used as a center-through coolant pump in the computer-controlled machine, where the coolant is pumped through a center of a tool used in the computer-controlled machine.

19. A coolant pump system for a computer-controlled machine, said system comprising:
- a servo motor including motor torque and motor speed sensors;
- a pump body mechanically coupled to the servo motor, where the pump body includes a pumping element which pumps coolant when actuated by rotation of the servo motor;
- a coolant pressure sensor at an outlet of the pump body;
- a coolant flow rate sensor in a fluid circuit downstream of the pump body; and
- a controller receiving signals from the motor torque and motor speed sensors, the coolant pressure sensor and the coolant flow rate sensor, said controller providing control signals to the servo motor, based on the received signals, to achieve a predetermined coolant pressure or coolant flow rate prescribed for a particular machining operation of the computer-controlled machine,
- where the controller also controls the computer-controlled machine, and the controller is configurable to provide control signals to the servo motor to achieve a different predetermined coolant pressure or coolant flow rate for each different machining operation of the computer-controlled machine, wherein the different machining operations include drilling, milling and thread tapping, and the predetermined coolant pressure or coolant flow rate is determined based on tool diameter, rotational speed and feed rate, and workpiece material.

20. A coolant pump for a computer-controlled machine, said pump comprising:
- a servo motor including motor torque and motor speed sensors;
- a pump body mechanically coupled to the servo motor, where the pump body includes a pumping element which pumps coolant when actuated by rotation of the servo motor; and
- a controller receiving signals from the motor torque and motor speed sensors, said controller providing control signals to the servo motor, based on the signals from the motor torque and motor speed sensors, to achieve a predetermined coolant pressure or coolant flow rate prescribed for a particular machining operation of the computer-controlled machine,
- where the controller is configured to take a preemptive action when the signals from the motor torque and motor speed sensors indicate a coolant supply problem, including a coolant supply problem indicated by a motor torque signal below a threshold value for a given motor speed.

* * * * *